United States Patent [19]

Ackley, Jr. et al.

[11] Patent Number: 4,657,130

[45] Date of Patent: Apr. 14, 1987

[54] DISCRETE SOLID OBJECT FEEDING AND TRANSPORT APPARATUS AND METHOD

[75] Inventors: Charles E. Ackley, Jr., Tuckerton, N.J.; Robert L. Ross, Philadelphia, Pa.

[73] Assignee: R. Hartnett Company, Philadelphia, Pa.

[21] Appl. No.: 627,399

[22] Filed: Jul. 3, 1984

[51] Int. Cl.$^4$ ............................................. B65G 47/24
[52] U.S. Cl. ................................... 198/397; 198/533; 198/550.1
[58] Field of Search ............... 198/533, 396, 397, 616, 198/480, 443, 558, 478, 550.6, 550.1; 221/236, 237

[56] References Cited

U.S. PATENT DOCUMENTS

| | | | |
|---|---|---|---|
| 3,292,768 | 12/1966 | Matthews | 221/237 |
| 3,352,402 | 11/1967 | Sorensen | 198/396 X |
| 3,710,921 | 1/1973 | Petiet | 198/396 X |
| 4,061,234 | 12/1977 | Bantien et al. | 198/616 X |
| 4,296,660 | 10/1981 | Cristiani | 198/480 X |
| 4,353,456 | 10/1982 | Yamamoto | 198/397 |
| 4,420,073 | 12/1983 | Häusler et al. | 198/579 |
| 4,469,217 | 9/1984 | Meyer et al. | 198/478 X |

Primary Examiner—Joseph E. Valenza
Assistant Examiner—D. Glenn Dayoan
Attorney, Agent, or Firm—Austin R. Miller

[57] ABSTRACT

Apparatus and methods are provided for loading individual objects into moving carriers where the carriers include receptacles for receiving the individual objects, where a hopper is provided to define a bulk supply of the objects, the carriers move past a hopper discharge orifice located close to the hopper bottom with the receptacles communicating with the hopper interior via the discharge orifice, first force is applied to objects which are close to the orifice by a roller operatively disassociated from the carriers, rotating in a direction generally toward the receptacles, to urge the objects through the orifice from the hopper towards the receptacles and second force is applied to objects further from the orifice by a rotating auger transversely disposed to the roller to move the objects along the hopper bottom towards the roller, where the receptacles ride on the surface of a rotating cylindrical drum.

21 Claims, 13 Drawing Figures

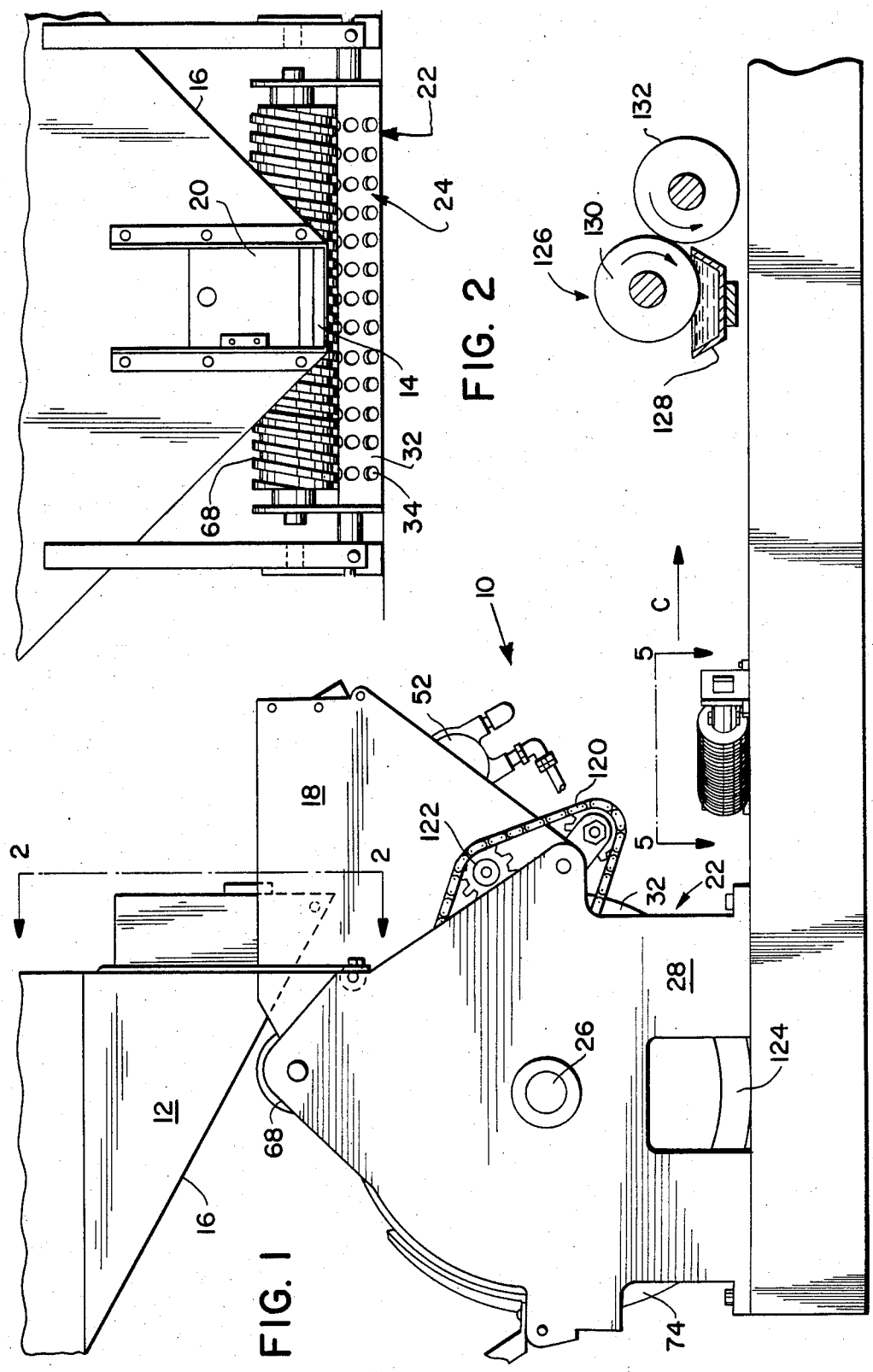

DISCRETE SOLID OBJECT FEEDING AND TRANSPORT APPARATUS AND METHOD

CROSS REFERENCE TO RELATED APPLICATION

This patent application discloses certain subject matter which is also disclosed in another patent application submitted in the name of Robert Ross and entitled "Object Feeding and Transport Apparatus and Method".

FIELD OF THE INVENTION

This invention relates to apparatus and methods for feeding and transporting pluralities of individual objects where the population of same consists of objects of substantially identical and repeatable size and shape.

BACKGROUND OF THE INVENTION

Apparatus for feeding, transporting and printing pluralities of individual objects, where the population consists of objects of substantially identical and repeatable size and shape, is known. The pharmaceutical and confectionary industries use such apparatus for conveying individual objects past a printing station for printing indicia, such as a trademark or other identifying information, thereon.

Representative of the prior art are U.S. Pat. Nos. 2,787,786; 2,859,689; 2,931,292; 3,026,792; 3,042,183; 3,200,556; 3,272,118; 3,613,861; 3,739,909; 3,838,766; 3,868,900; 3,871,295; 3,884,143; 3,912,120; 3,917,055; 3,931,884; 4,069,753; and 4,308,942.

Prior art apparatus have used gravity to feed tablets, capsules, candies and the like to rotating transport cylinders. Gravity induced feed as illustrated in U.S. Pat. No. 4,308,942 is typical and has been used heretofore with tablets, pills and capsules having substantially smooth, dry exteriors and having regular shapes, e.g. telescoping capsules, spherical pills and cylindrical tablets.

With the advent of tablets and other solid objects which are odd shaped and/or which do not have substantially smooth, dry exteriors and with the need for ever-higher rates of tablet, capsule, pill and other solid object processing, gravity induced feed no longer provides adequate feed rates and does not provide acceptable fill efficiency in the rotating transport cylinders. Screw conveyors at the bottoms of storage hoppers have been used in an attempt to achieve acceptable feed rates and fill efficiencies and have achieved some measure of improvement. Also, vacuum has been employed to help draw lightweight objects, specifically empty telescoping pharmaceutical capsules, from hoppers to transport cylinders. However, the need remains for even greater feed rates and fill efficiencies and for reliable apparatus filling these needs, particularly in connection with objects which are odd-shaped and/or have smooth, dry exteriors.

OBJECTS OF THE INVENTIONS

The primary object of this invention is to provide highly reliable methods and apparatus for feeding solid objects which may have odd-shaped and/or rough and/or highly slippery and/or polished exteriors, from a bulk supply thereof into transport pockets for transport past a work station, such as a printing location where indentifying indicia may be printed on the objects, with greater speed and fill efficiency than have been achieved heretofore.

SUMMARY OF THE INVENTION

This invention provides apparatus for transporting pharmaceutical tablets, pills, filled or empty pharmaceutical capsules, solid candies and similar individual solid objects past a work station, such as a printing station, a piercing station or the like. In light of the utility of the invention for transporting and processing these various types of objects, use of "object" herein is not to be construed to limit the invention to pharmaceutical tablets but is to be broadly construed to encompass not only pharmaceutical tablets but also pharmaceutical pills, filled and unfilled pharmaceutical capsules, solid candies and other individual solid objects where the object population consists of solid or hollow objects of substantially repeatable size and shape.

The apparatus includes a hopper for housing a bulk supply of the objects and including a discharge orifice in the hopper. A spaced array of carrier means is provided, each for receiving and transporting one of the objects. The carrier means communicate with the hopper via a hopper orifice as the carrier means move past the orifice with receptacle portions of the carrier means facing the orifice. First means are provided, intermediate the hopper bottom and the carrier means, proximate the hopper orifice, for moving the objects from the hopper to the receptacle portions of the carrier means via the orifice. The first moving means contacts at least a substantial number of the objects and urges them towards the receptacle portions of the carrier means. The first moving means includes a surface portion for contacting the objects which moves in a direction from the orifice towards the receptacle portions. Second means are provided for moving the objects within the hopper along the hopper bottom towards the hopper orifice for delivery through the orifice by the first means to the carrier means.

In the apparatus a spaced array of carrier means may form part of an object conveyor with the apparatus further including means for positioning individual objects in receptacle portions of the conveyor by contacting the objects as they pass the positioning means and urging the objects downwardly against the receptacle bottoms and, simultaneously, urging any objects which are off-center with respect to the direction of travel past the positioning means laterally into the center of the receptacle portions of the conveyor.

Vibration may be applied to the hopper to encourage downward flow of objects within the hopper to facilitate filling the objects into the carrier means. A set of partitions may be provided within the hopper for separating the objects within the hopper into groups corresponding to spacing of the array of carrier means, to facilitate movement of bottom objects of the groups along the hopper bottom by the second moving means towards the hopper orifice for delivery through the orifice by the first moving means to the carrier means. The partitions may also serve to orient the objects in preparation for transfer to the carrier means.

The invention also encompasses methods for loading individual objects into moving carrier means where the carrier means include receptacles for receiving the individual objects. The methods may include the steps of placing the objects in a hopper to define a bulk supply of the objects, moving the carrier means past a hopper discharge orifice located proximate the hopper bottom with the receptacles communicating with the hopper interior via the orifice, applying first force to objects which are proximate the orifice, via first force application means operatively disassociated from the carrier means, in a direction generally towards the receptacles to urge the objects through the orifice from the hopper towards the receptacles and applying second force to objects which are close to the hopper bottom, via second force application means operatively disassociated from said first force application means and said carrier means, to urge the objects along the bottom of the hopper towards the hopper discharge orifice. The carrier means preferably move past the orifice continuously.

The first force is preferably applied to the objects by contacting the objects with a first moving surface between the orifice and the receptacles, having at least a portion of the surface moving from the orifice towards the receptacles. The first moving surface is preferably a rotating surface moving towards the receptacles. The second force is preferably applied to the objects by contacting the objects with a second moving surface close to the bottom of the hopper, having at least a portion of the surface moving the objects along the hopper bottom towards the orifice.

The methods may further encompass biasing the objects downwardly within conveyor receptacles prior to reaching a work station and, if needed, urging the objects laterally into center positions of the object receptacles.

DESCRIPTION OF THE DRAWINGS

FIG. 1 is a side elevation of apparatus embodying aspects of the invention.

FIG. 2 is an end elevation of apparatus illustrated in FIG. 1, taken at 2—2 in FIG. 1, with lower extremities of apparatus illustrated in FIG. 1 not shown.

Figure 3:
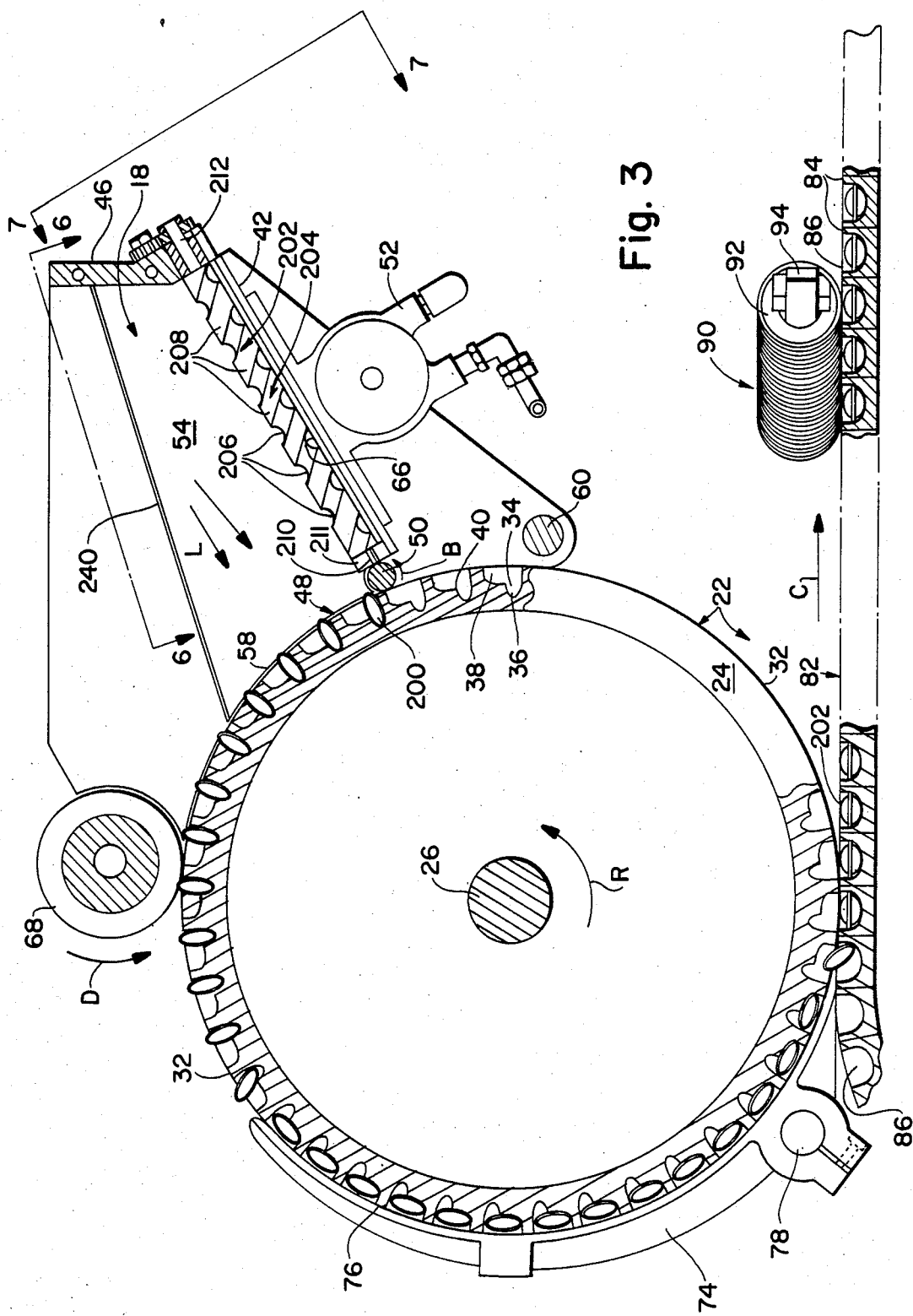
FIG. 3 is an enlarged longitudinal sectional view taken at the same side as FIG. 1, but with certain parts removed and other parts shown in section.

DETAILED DESCRIPTION OF THE PREFERRED EMBODIMENT OF THE INVENTION AND THE BEST MODE CONTEMPLATED FOR PRACTICE THEREOF

Apparatus embodying the invention for loading and for transporting objects is illustrated in FIG. 1 and is designated generally 10. Apparatus 10 includes a first hopper 12 having a discharge opening 14 therein, best seen in FIG. 2. Discharge opening 14 is located at the bottom of hopper 12, with hopper 12 providing temporary storage of a bulk supply of objects to be fed and transported. Discharge opening 14 permits gravity induced generally downward flow of objects from hopper 12. Somewhat steeply sloping walls 16 of hopper 12 permit and facilitate gravity induced generally downwardly flow of objects from hopper 12 via discharge opening 14 into a second hopper 18. Second hopper 18 receives downward flow of objects from first hopper 12 via discharge opening 14, with downward flow being regulated by a moveable door 20 equipped with a magnetic latch so that position of door 20, regulating the size of discharge opening 14, may be fixed. Door 20 moves in suitable channels affixed to the facing surface of first hopper 12, as shown in FIG. 2.

Second hopper 18 is open at the top to receive object flow thereinto and includes an opening in a lower portion for discharge of objects from second hopper 18 to conveying means designated generally 22 in FIGS. 1, 2 and 3.

Conveying means 22 include a rotating transport cylinder 24 mounted on a shaft 26 journaled in side frame members, one of which is designated 28 in FIG. 1. Cylinder 24 and shaft 26 are operatively connected by a suitable clutch-pawl assembly, permitting disengagement of cylinder 24 from shaft 26 whenever desired. Shaft 26 rotates whenever the machine motor is running, and is driven by the motor via suitable gears. Rotating transport cylinder 24 includes object carrier means 34 at the curved surface 32 of cylinder 24. The object carrier means 34 are preferably arranged equally spaced in a plurality of parallel rows around the curved exterior surface 32 of cylinder 24. The positioning and spacing of carrier means 34 define a moving array into which the objects are loaded.

Figure 4:
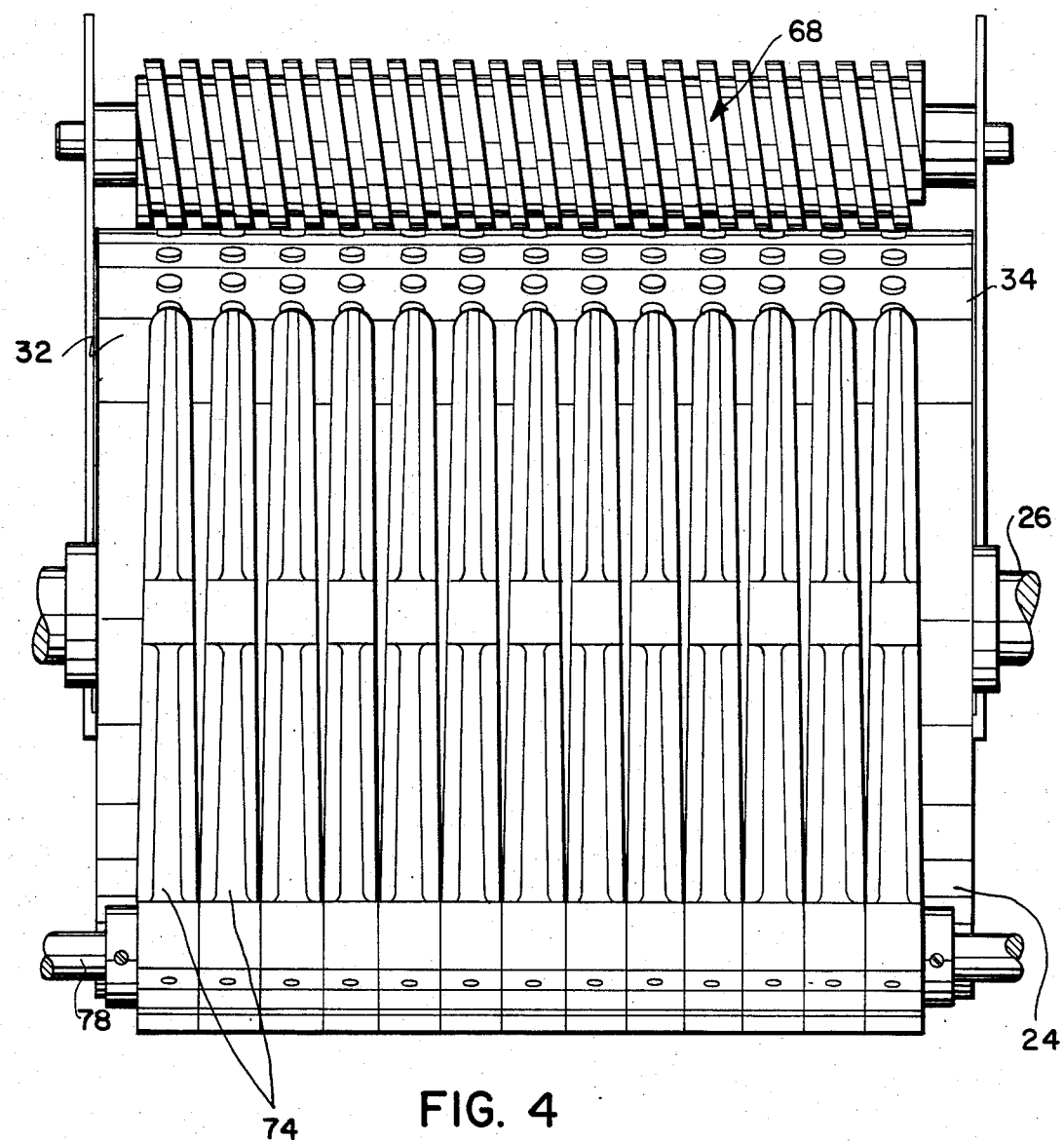
FIG. 4 is an end view looking from the left-hand end of FIG. 3.

In FIGS. 2, 3 and 4 carrier means 34 are shown as cavities formed in curved surface 32 of cylinder 24. Each cavity includes a radial portion 36 and a longitudinal portion 38 connected by a suitably shaped transfer surface 40. Of course the internal shape of carrier means 34 and the presence or absence of discrete portions 36, 38 of carrier means 34 is a function of the particular size and shape of objects being transported and any manipulation of the objects which must be done during transport.

Second hopper 18 includes a bottom 42 and also includes side walls 44 which are secured to a front wall 46 by suitable screws, not numbered. Second hopper 18 fits closely about the curved exterior of conveyor means 22 to preclude escape of objects therebetween as objects are received from second hopper 18 by carrier means 34. Bottom 42 slopes substantially, as illustrated in FIG. 3, to encourage flow of objects within second hopper 18 towards a discharge orifice 48 formed in the curved portion of second hopper 18 which fits closely about conveyor means 22. Objects within second hopper 18 are transferred into object carrier means 34 through discharge orifice 48.

A roller 50 is located substantially at the bottom of orifice 48, generally between the hopper bottom and the object carrier means 34 and moves the objects from the hopper towards the carrier means 34 via orifice 48. Roller 50 rotates in a counter-clockwise direction viewed in FIG. 3. As roller 50 rotates it moves the objects which are within second hopper 18 and close to the hopper discharge orifice by contacting them and urging them towards the object carrier means 34 through orifice 48. The upper portion of the surface of roller 50 moves in a direction from hopper 18 towards carrier means 34 as the roller rotates. Preferably the upper surface of roller 50 is positioned generally tangent to a line drawn along the upper surface of auger 202, as illustrated in FIG. 3. Roller 50 preferably rotates continuously so that the surface of roller 50 moves along a predetermined circular path which is arcuate in the area where the upper surface of roller 50 contacts objects within second hopper 18.

Figure 7:
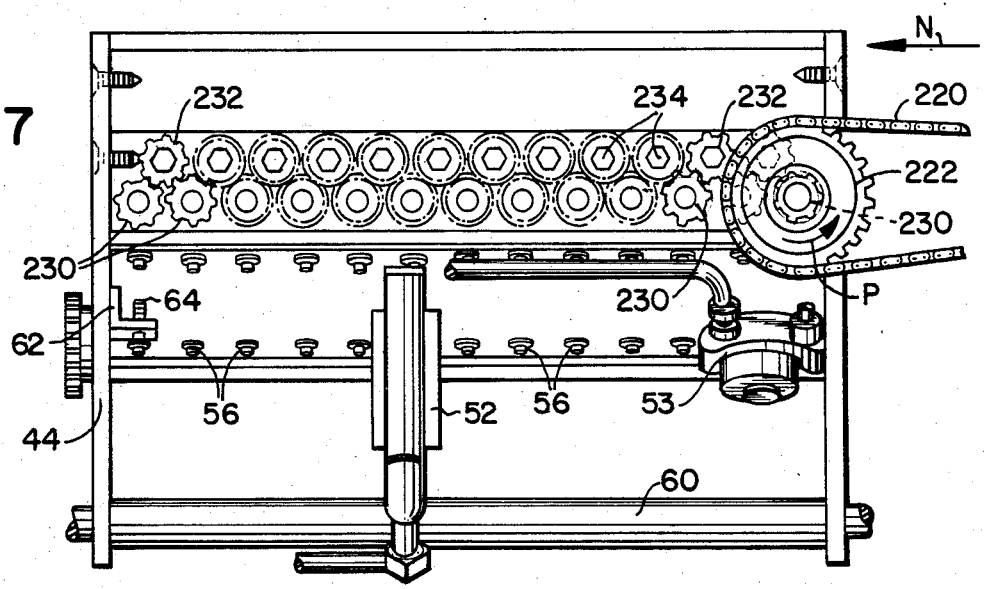
FIG. 7 is a partial end view taken at 7—7 in FIG. 3.

Secured to bottom 42 of hopper 18 may be at least one vibrator 52 which may be in the form of a pneumatically driven eccentric. Vibrator 52 imparts oscillatory motion to at least bottom 42 of hopper 18 and to upstanding separator guides 54 within hopper 18. A second vibrator 53 may also be provided in the form of a pneumatically driven eccentric, as illustrated in FIG. 7. Where two vibrators are used, they may be positioned to vibrate the hopper bottom simultaneously in different directions. When positioned as shown in FIGS. 1, 3 and 7, vibrator 52 vibrates hopper bottom 42 in a direction perpendicular to bottom 42 while vibrator 53 vibrates hopper bottom 42 parallel with the plane of hopper bottom 42, towards and away from feed drum 24. The pneumatically driven eccentrics are connected to a suitable compressed air supply, not shown.

Figure 6:
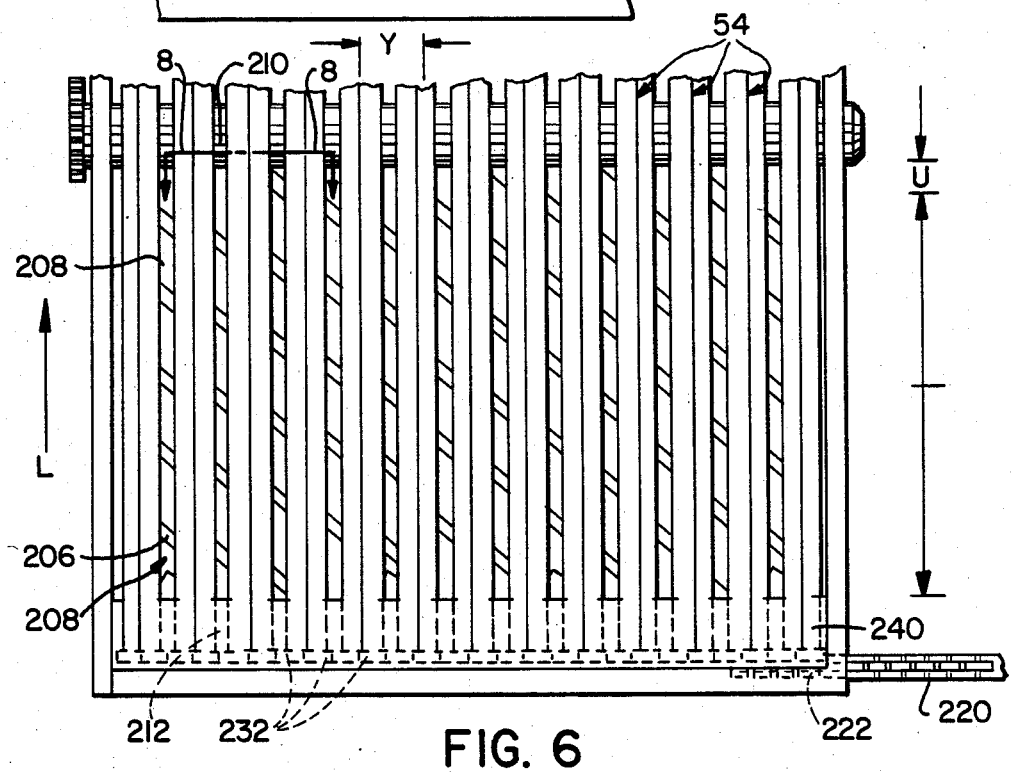
FIG. 6 is a partial top view taken at 6—6 in FIG. 3.

Separator guides 54 are secured to bottom 42 of hopper 18 and are best shown in FIGS. 3 and 6. Guides 54 are connected to bottom 42 via suitable screws 56 shown in FIG. 7. Guides 54 preferably fit closely about the curved surface of transport cylinder 24 within hopper 18 and have a curved surface 58 of only slightly larger radius than curved surface 32 of cylinder 26.

As best shown in FIG. 3, bottom 42 of second hopper 18 slopes downwardly to encourage flow of objects within hopper 18 towards discharge opening 48 formed in the curved exterior portion of hopper 18.

Located within hopper 18, preferably at the bottom thereof, is at least one and preferably a plurality of augers, individually denoted generally 202, which are parallel one with another and generally radially disposed with respect to transport cylinder 24. Augers 202 extend outwardly away from transport cylinder 24 at an angle above horizontal as illustrated in FIG. 3; the parallel orientation of augers 202 is also evident from FIGS. 6, 7 and 8. Preferably one auger is provided for each circumferential row of carrier means 34 around the curved surface of transport cylinder 24, however two or more augers could be supplied for each row of carrier means.

Figure 8:
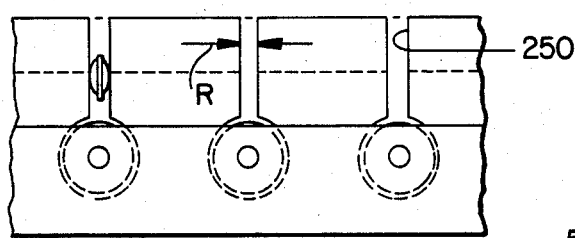
FIG. 8 is a broken view taken at 8—8 in FIG. 6.

Within second hopper 18, separator guides 54 are parallel one with another and spaced apart preferably only slightly more than the thickness or minimum dimension of the objects to be loaded and transported. This is sufficient spacing to allow objects entering second hopper 18 from above to fall sideways between the guides into contact with augers 202, as depicted in FIG. 8, with the circumferential belly band surfaces of the objects, denoted 300 in FIGS. 11 and 12, generally vertically oriented, as illustrated in FIGS. 3 and 8. Guides 54 partition downward flow of objects into a plurality of downwardly flowing streams, with one stream flowing to and piling up on each auger 202. Each guide 54 is positioned between two augers 202, as illustrated in FIGS. 6 and 8. Space between each pair of guides is occupied by downward flowing objects, oriented as shown in FIG. 8, and is denoted as being of width R in FIG. 8. When the objects are pharmaceutical tablets of the type shown in FIGS. 11 and 12, R is selected to be narrower than length S and narrower than width W but wider than thickness T of the oblong tablet objects depicted in FIGS. 11 and 12. Thickness T is, of course, the minimum of the three cross-sectional dimensions.

The relationship between the minimum object cross-sectional dimension and the guide spacing can be important for difficult-to-feed, oblong tablet objects. Spacing the guides apart a distance less than the length and width but greater than the thickness of the objects assures that the objects are fed to transport cylinder 24 by augers 202 with their longitudinal axes generally parallel with the axis of the auger and with their belly band surfaces 300 contacting the auger. This resultant generally end-to-end feed of the oriented objects to the vicinity of roller 50 and object carrier means 34 in cylinder 24 produces a high percentage fill of carrier means 34, with the objects entering the radial portions 36 of carrier means 34 in a lengthwise orientation and with their belly bands oriented so that the axes of the objects along which thickness T is measured are generally parallel to the axis of rotation of transport cylinder 24.

Each auger 202 includes a central portion 204 having a helical screw-thread-like groove 206 formed therein with a ribbon-like portion 208 separating successive flights of groove 206. At either end of each auger 202 are cylindrical portions, which may have diameter reduced from central portion 204. The cylindrical end portion of the auger most proximate transport cylinder 24 is denoted 210 while the second cylindrical end portion, more remote from transport cylinder 24, is denoted 212. Portions 210 and 212 are journaled in suitable bearings or bearing surfaces to facilitate rotation of augers 202. The apparatus in the area of auger cylindrical end portion 210 is designed to minimize the distance from the end of the auger groove to the roller 50, so that the objects are positively driven by the augers as close as possible to roller 50. One suitable construction is illustrated in the drawings, particularly FIGS. 3, 6, 7 and 8, in which flat cylindrical end portion 210 of an auger 202 is journaled in a tab 211, which extends upwards from the hopper bottom 42, and second cylindrical end portion 212 is journaled in an unnumbered sleeve fitted into hopper front wall 46.

The number of guides 54 is preferably chosen to provide one column or pile of objects in hopper 18 resting on each auger, for supply to a corresponding row of carrier means 34 on the curved surface of transport cylinder 24.

If more than one auger is provided between each separator guide, the augers may be spaced apart so the objects fall between the augers and are moved along the hopper bottom as the augers apply driving force to either or both sides of the objects.

The mechanism facilitating driving rotation of augers 202 is illustrated in FIG. 7 and includes a chain 220 engaging a master sprocket 222 mounted on a shaft extending from an auger 202, located at the extreme right-hand side in second hopper 24 looking at FIG. 6. Any suitable motor can be used to drive chain 220. Also, any other suitable means can be used to drive augers 202.

Each second cylindrical end portion 212 of an auger 202 has a driving gear 230 affixed thereto. Only some of driving gears 230 are illustrated in FIG. 7, to insure drawing clarity. A plurality of idler gears 232 are rotatable on idler shafts 234 with each idler gear 232 meshingly engaging two driving gears 230. Chain 220, driven by a motor, not shown, moves in direction N in FIG. 7 to rotate master sprocket 222 in the direction shown by arrow P in FIG. 7. Due to the serial engagement of individual idler gears 232 between each pair of driving gears 230, all driving gears 230 rotate in the direction indicated by arrow P in FIG. 6 while all idler gears 232 rotate in the opposite direction; the arrangement of the gears if driving gear 230—idler gear 232—driving gear 230—idler gear 232—driving gear 230, etc. Rotation of driving gears 230 in direction P with consequent rotation of augers 202 in the same direction P results in objects engaged by helical groove 206 of an auger 202 moving in direction L in FIG. 3, towards transport cylinder 24.

Referring to FIG. 6, guides 54 may have upper surfaces 240 which are slightly peaked to prevent any objects within second hopper 18 from resting on an upper surface of a guide 54; the peak encourages objects to fall to one side or the other of a guide 54.

Looking downwardly into second hopper 18, as indicated by arrows 6—6 in FIG. 3, only a narrow axial strip portion of each auger 202 can be seen. The remaining portion of each auger 202 is blocked from view by partitioning guides 54, which are separated by distance R as shown in FIGS. 6 and 8. As seen in FIG. 8, distance R preferably is less than the outer diameter of auger 202, indicated as Y in FIG. 8. Distance R is chosen based on the dimensions and shape of objects to be processed by the apparatus. If the objects are tablets having a configuration such as that depicted in FIGS. 11 and 12, R might typically be chosen to be less than tablet length and width but greater than tablet thickness, as described above.

A floating construction of hopper bottom 42 relative to hopper sides 44 may be provided. Hopper sides 44 are connected to a stationary shaft 60, shown in FIG. 3, which extends between side frame members 28, 30, shown in FIG. 5. Suitable angle members 62 may be secured to downwardly extending portions of side walls 44 of second hopper 18; only one such angle member 62 is shown in FIG. 7 to aid the clarity of the drawing. Suitable screw-nut combinations, not numbered, may connect bottom 42 of second hopper 18 to the angle members. The screw heads of the screw-nut combinations may be secured to hopper bottom 42 and the nuts of the screw-nut combinations may be separated from hopper bottom 42 by angle members 62. Rubber grommets separate the unnumbered nuts from the angle members 62. The holes in the angle members through which the screws fit are clearance holes, permitting free movement of the screws, and consequently bottom 42, towards and away from the angle members. Coil springs 64 surround the screw of each screw-nut combination and bias bottom 42 away from the angle members 62. Hence second hopper 18 has a floating bottom 42 which is moveable with respect to hopper sides 44.

During operation of vibrator 52, which is rigidly connected to bottom 42, bottom 42 vibrates in a direction generally transverse to the inner surface of bottom 42, designated 66 in FIG. 3. As vibrator 52 vibrates, the coil springs 64 and the grommets cushion bottom 42 as it oscillates towards and away from angle members 62.

A rotatable brush 68 is located close to the top of transport cylinder 24 and is mounted on a suitable shaft journaled between side frames 28, 30, as illustrated in FIGS. 1, 2, 3, and 4. Brush 68 may be helically cut, as shown in FIG. 4, or may be smooth. In either case the outer extremity of the brush just clears the curved surface 32 of cylinder 24.

Backguide members 74 have a curved inner surface 76 sized for close fitting about curved surface 32 of transport cylinder 24. Backguide members 74 extend around the curved surface of transport cylinder 24 to a position close to the bottom dead center of transport cylinder 24, all as shown in FIGS. 3 and 4. Backguide members 74 are mounted on a stationary shaft 78 which is secured to and extends between the side frames, which are not illustrated in FIG. 4. Close fit of backguide members 74 about the curved surface of transport cylinder 24 precludes objects in carrier means 34 from falling therefrom as the objects are transported by cylinder 24 rotating in the direction indicated by Arrow A in FIG. 3.

As an alternative to the backguide shown herein, a fluid manifold may be provided between the side frames, as disclosed in the patent application referenced above, where the fluid manifold may be part of a pneumatic system to assist in turning or otherwise manipulating the objects as they are transported from the hopper 18 to a work station. Extending from such a manifold may be a plurality of tubes leading into passageways formed in suitable backguide members.

The backguide members, whether of the type disclosed in the above-referenced copending application or of the type disclosed herein as backguides 74, have a curved inner surface sized for close fitting about curved surface 32 of transport cylinder 24. Both types of backguide members extend around the curved surface of transport cylinder 24 to a position close to the bottom dead center of transport cylinder 24, as shown in FIGS. 3 and 4, and preclude objects in carrier means 34 from falling therefrom as the objects are transported by cylinder 24 rotating in the direction indicated by arrow A in FIG. 3.

If the backguides are of the type disclosed in the application referenced above, tubes extending from the manifold and connecting with the passages through the back guide members provide pneumatic pressure directed at the objects to assist in manipulating the objects as they are conveyed in the carrier means 34 at the surface of cylinder 24. The manifold is fed by a line with a suitable pressure regulator interposed between the manifold and the source of pressured fluid, preferably air.

Figures 11, 12:
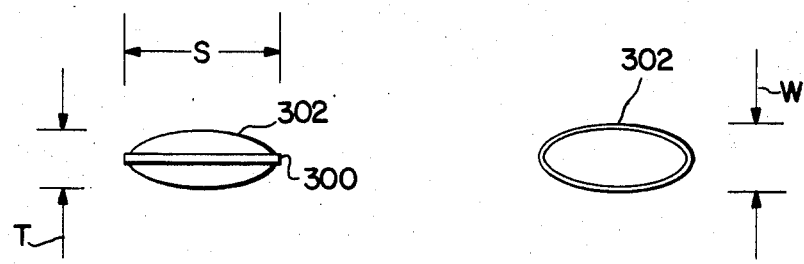
FIG. 11 is a side view of a pharmaceutical tablet representing one type of object which may be processed according to the invention.
FIG. 12 is a top view of the pharmaceutical tablet illustrated in FIG. 11.
Figure 5:
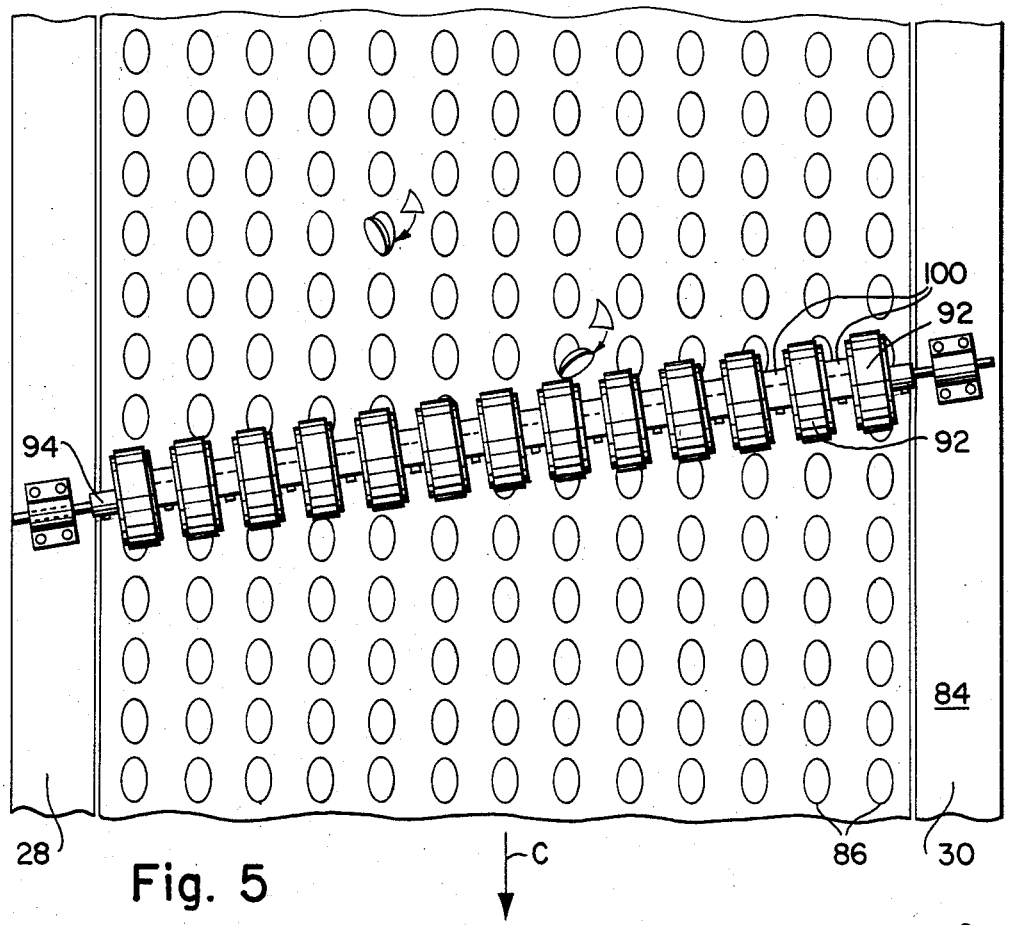
FIG. 5 is a top view showing a portion of the apparatus illustrated in FIG. 1, taken at the position indicated by arrows 5—5 in FIG. 1.

Forming an additional portion of conveying means 22 and disposed below rotating transport cylinder 24 is a preferably endless horizontal conveyor 82, of the type known in the art, which includes conveyor bars 84 connected together by a suitable chain or other concatination device, not shown. Each conveyor bar 84 includes one or more cavities or receptacles 86 formed therein for receiving objects from rotating transport cylinder 24 and transporting the objects to a work station, not shown. It is preferable that each conveyor bar 84 include a plurality of receptacles 86 as illustrated in FIG. 5, with the rows of receptacles in conveyor 82 corresponding to rows of carrier means 34 in transport cylinder 24. When objects of the type illustrated in FIGS. 11 and 12 are being fed, it may be desirable that the rows of receptacles 86 in conveyor 82 be slightly offset from, rather than aligned with, the rows of carrier means 34 in transport cylinder 24, to assist the objects in assuming the desired orientation in receptacles 86, as described in more detail below.

Conveyor bars 84 ride in a suitable track formed in side frames 28 and 30 and are secured to a continuous chain via pins, screws or other suitable devices. Neither the chain nor the pins, screws or other connecting devices have been shown in FIG. 5.

In FIG. 3 the numeral 90 generally denotes a means for positioning individual objects in receptacle portions 86 of conveyor bars 84 by contacting the objects as they pass positioning means 90 in conveyor 82. Positioning means 90 includes a plurality of individual rollers 92 each mounted on a mounting bar 94 and each being individually rotatable with respect to the other rollers. Each roller 92 includes an outer cylindrical portion 96 and an inner hub portion 98. Outer portion 96 is freely rotatable with respect to hub 98, via internal bearings, not shown in FIGS. 9 and 10.

Figures 9, 10:
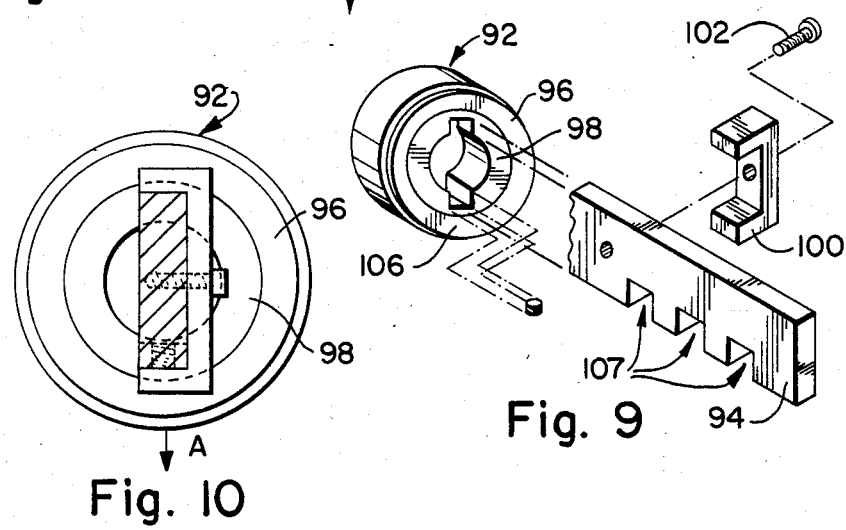
FIG. 9 is an exploded isometric view of a portion of the apparatus illustrated in FIG. 3.
FIG. 10 is a sectional view of apparatus illustrated in FIG. 9.

As best shown in FIGS. 9 and 10, each hub 98 is slotted to receive mounting bar 94. A screw 102 passes through a hole, not numbered, in a spacer 100 and retains spacer 100 in position on bar 94. A coil spring 104 compressed between the upper surface of a recess 107 formed in the bottom edge of bar 94 and a footing 106 formed in hub 98, provides resilient bias of roller 92 downwardly with respect to mounting bar 94, in the direction shown by arrow A in FIG. 10. Spacers 100 separate adjacent rollers 92 one from another along bar 94, as shown in FIG. 5.

As shown in FIG. 5, a plurality of rollers 92 are mounted on mounting bar 94, one roller 92 for each receptacle 86 formed in a conveyor bar 84. Rollers 92 are located so that the bottom dead center of each roller, i.e. the portion of each roller closest to conveyor bars 84, is over a corresponding one of receptacles 86. Bar 94 is parallel with the horizontal plane in which conveyor 82 moves as conveyor bars 84 receive the objects and transport them to a work station. However bar 94 is preferably disposed at an angle skew to the direction of travel of conveyor 82, which is indicated by arrow C in FIG. 3. Bar 94 is supported by two pedestal members, not numbered, mounted on side frames 28, 30, as shown in FIG. 5.

Figure 13:
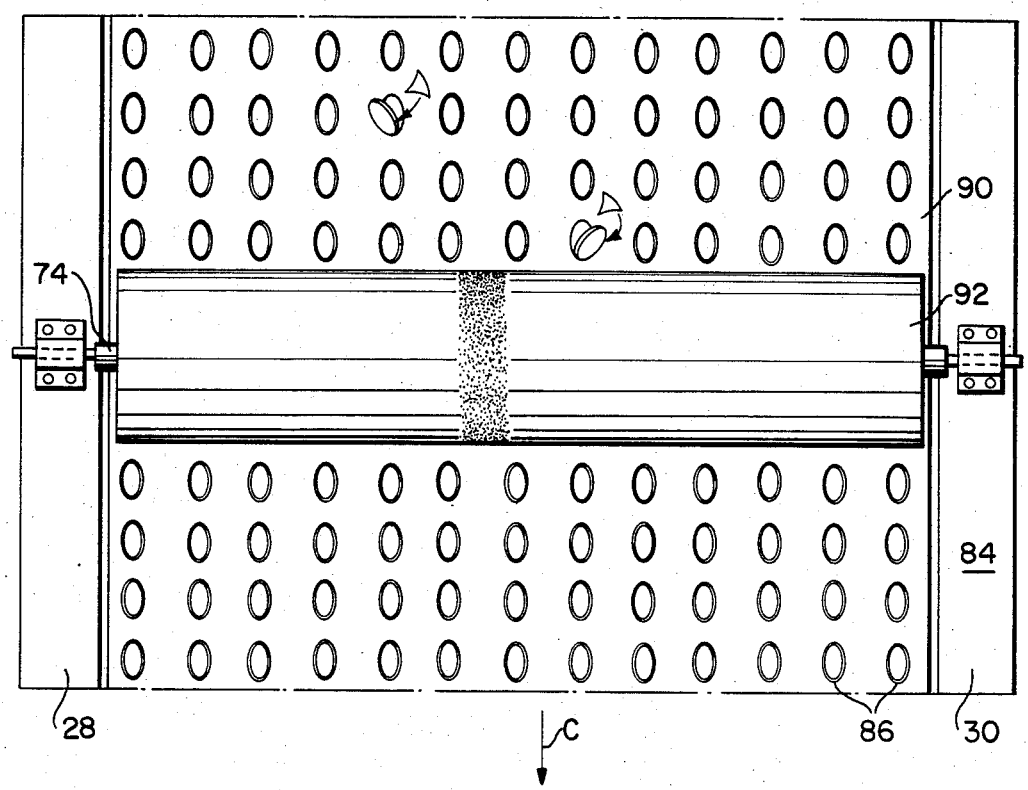
FIG. 13 is a top view taken at the same position as FIG. 5, showing an alternate embodiment of apparatus manifesting aspects of the invention.

Each roller 92 may have a flat circumferential exterior surface or may have grooves formed in its curved exterior surface. As a further alternative, one or more brushes may be substituted for rollers 92, as illustrated in FIG. 13. The brushes may be stationary, rotatable as idler brushes or may be actively driven. Selection is governed by the characteristics of the objects being positioned and transported in conveyor 82.

A motor and associated gearing rotate shaft 26 thereby rotating transport cylinder 24 when the clutch-pawl assembly is engaged. Roller 50 is driven by the same motor via a chain driving a sprocket mounted on a shaft commonly with roller 50, as illustrated in FIG. 1. An idler sprocket may be provided to maintain suitable tension in the chain, as shown. Similarly, brush 68 and conveyor 82 are all driven by the same motor via common gearing, not shown.

The work station to which the objects are conveyed is designated generally 126 and may be a printing station at which the objects are printed as they pass the work station in receptacles 86 formed in conveyor bars 84. At work station 126 there is shown schematically an ink pan 128, a first roller 130 and a second roller 132. Conventionally ink is removed from pan 128 as first roller 130 rotates through the ink. Ink fills engraved patterns formed in the surface of first roller 130 and is transferred in the pattern to second roller 132 as those rollers contact at their point of tangency. Second roller 132 then contacts the objects in receptacles 86 thereby imparting the printing indicia to them. In the trade the first roller is referred to as a "design roll" while the second roller is referred to as a "rubber roll."

During operation of the invention a group of objects, such as pharmaceutical tablets, is placed in first hopper 12. Moveable door 20 is raised sufficiently to provide a discharge opening 14 of preselected size so that the objects flow from first hopper 12 down into second hopper 18. Within second hopper 18 the objects fall between upstanding guides 54 thereby forming parallel columns of objects by piling up on respective augers 202 at the bottom 42 of second hopper 18. When the objects are as illustrated in FIGS. 11 and 12 and the guides 54 are spaced as described above, the objects fall between the guides and onto augers 202, and lie on their belly bands with their belly band surfaces generally vertically oriented. Vibration of bottom 42 and upstanding guides 54 may be supplied by vibrators 52 and 53; this encourages the objects to fall into the spaces between guides 54 and to move downwardly to the augers 202.

A pair of guides 54 or a single guide 54 and a side wall of the hopper provide lateral support for each column of objects.

As augers 202 rotate, objects from the lower extremities of the columns are transported by the helical grooves in the augers, in a direction L in FIGS. 3 and 6, to the area at the ends of respective augers, proximate roller 50 and transport cylinder 24. As the augers continue to rotate they continue to attempt to feed objects in the direction L, into the area where the objects can be contacted by roller 50. This results in a slight force being exerted by objects resting on the axial length of augers 202 against objects in the neighborhood of roller 50, with this pressure being in direction L in FIGS. 3 and 6. This ensures that roller 50 has plenty of objects to transfer to carrier means 34. When the objects are lying on their belly bands with their belly band surface vertically oriented as shown in FIG. 8, roller 50 contacts the belly band surfaces and frictionally transfers the objects into the carrier means 34 with the longitudinal axes of the objects disposed radially with respect to the axis of the transport cylinder and with parts of the belly band surface parallel with the curved surface of the transport cylinder 24.

Roller 50 rotates in the direction indicated by arrow B in FIG. 3 and urges objects it contacts, and objects contacted by those objects, through orifice 48, out of hopper 18 towards carrier means 34. Roller 50 applies force, to the objects which are proximate orifice 48, in a direction towards carrier means 34. Roller 50 is operatively disassociated from the carrier means and is journaled in suitable bearings secured within side wall 44 of second hopper 18.

Transport cylinder 26 rotates continuously thereby moving carrier means 34 past orifice 48 continuously. Roller 50, having a curved surface, applies force to the objects with a rotating surface moving towards receptacles 34.

In FIG. 3 roller 50 is positioned between the bottom 42 of hopper 18 and transport cylinder 24. Alternate configurations are possible, such as where roller 50 is displaced from transport cylinder 24 and a step member is interposed between roller 50 and transport cylinder 24. In such case, as the objects travel along bottom 42 of second hopper 18 due to the action of augers 202, the objects are contacted by the rotating curved surface of roller 50 and urged onto the step member. Objects successively contacted by roller 50 apply force to and contact other objects closer to transport cylinder 24, thereby urging the object closest to transport cylinder 24 to enter the next approaching carrier means 34. With the exception of the provision of the step member and the position of roller 50 with respect to transport cylinder 24, such an embodiment could utilize all the structure illustrated in FIGS. 1 through 8.

Roller 50 can also be located at a different angular position, with respect to the axis of transport cylinder 24, from that shown. Relocating roller 50 in such manner would change the geometric relationship between roller 50 and augers 202. Such location of roller 50 may be desirable depending on the characteristics of the objects being transported. Another possibility is to use two or more rollers 50, with or without one or more small steps separating them.

Once objects have been fed into carrier means 34 via orifice 48, those objects are carried by transport cylinder 24 from hopper 18 around to the bottom dead center position where the objects may be transferred into conveyor 82. When the objects are oblong, most of the objects are initially loaded into radial portions 36 of object carrier means 34, as illustrated by object 200 in FIG. 3. The objects are then carried upwardly as rotating transport cylinder 24 rotates and are contacted by rotating brush 68, rotating in the direction indicated by arrow D in FIG. 3. If two or more objects have occupied a single one of the carrier means 34, brush 68 removes the excess object(s), leaving only one object per carrier means position. Brush 68 also retains the bulk of the objects in the hopper, resisting the tendency of these objects to move with transport cylinder 24.

As the objects continue their travel with transport cylinder 24, internal cams may be provided within transport cylinder 24, acting through slots in transport cylinder 24 in a manner known in the art, to insure that any objects which have not shifted from the radial portion 36 to the longitudinal portion 38 do so, by contacting any objects which have remained in radial portion 36, while the objects are under the influence of back-guide 74.

The objects continue to travel as transport cylinder 74 rotates, until reaching the bottom dead center position of rotating transport cylinder 24, where transport cylinder 24 and conveyor 82 are nearly tangent. At this position the objects transfer, preferably by gravity, from transport cylinder 24 into appropriate receptacles 86 in conveyor bars 84. If the objects are shaped as shown in FIGS. 11 and 12 and if the rows of carrier means 34 are offset from the rows of receptacles 86 and if the receptacles have a curved bottom interior surface 87 as illustrated in FIG. 1, the objects rotate ninety degrees as they transfer from carrier means 34 to receptacles 86, to a position at which bulbous surface 302 face up and down and the belly band surface 300 faces laterally, as illustrated by object 202 in FIG. 3.

The objects are transported by conveyor 82 past positioning means 90, which gently press the objects downward into receptacles 86. The objects may be aligned longitudinally with their respective receptacles 86 merely by downward pressure of means 90 and/or by action of grooves in the external surface of rollers 92. In FIG. 5 where conveyor travel is denoted by arrow C, some misaligned objects are indicated by arrow D prior to object travel underneath positioning means 90.

Upon contact with downwardly biased rollers 92 and/or a suitable brush as described above, mispositioned objects are properly positioned within their receptacles in conveyor bars 84. The objects can then be printed, counted, treated, pierced or processed in any other fashion at a suitable work station to which the objects are conveyed by conveyor bars 84.

While object carrier means 34 have been depicted as cavities formed in the surface of transport cylinder 24, carrier means 34 could just as well be provided by small cradles or other structures mounted on the surface of transport cylinder 24. Similarly, while carrier bars 84 have been shown equipped with receptacles 86 for receiving the objects to be transported, other suitable carrier means could be provided on carrier bars 84 in lieu of receptacles 86. Indeed, depending on the function for which the apparatus is being used, one or more additional transport cylinders may be provided and/or conveyor 82 may be deleted. Also, positioning means 90 may be applied to objects carried by a rotating transport cylinder such as cylinder 24.

Rollers 92 have been found to work particularly well when their outer cylindrical portion has been made of plastic such as Delrin. It has sometimes been found to be desirable to provide some lead to grooves 108, 110, thereby actually providing a surface thread on outer portion 96 of roller 92.

While the invention has been disclosed and described in certain particulars, it is to be understood that the invention is not limited to the apparatus and methods described herein and that substitution of equivalent apparatus or steps of operation may be made and still be within the scope of this invention.

What is claimed is:

1. Apparatus for loading individual objects into a moving array, comprising:
    (a) a hopper for housing a bulk supply of said objects and including a discharge orifice;
    (b) a spaced array of carrier means, each for receiving and transporting said objects, said carrier means communicating with said hopper via said orifice as said carrier means move past said orifice with receptacle portions of said carrier means facing said orifice, with a portion of said hopper substantially conforming to the shape of said carrier means;
    (c) object moving means positioned intermediate the hopper bottom and said carrier means, and having a surface contacting said objects, moving in a direction from said orifice toward said receptacle portions, for moving said objects from said hopper to said receptacle portions of said carrier means via said orifice; and
    (d) positive conveying means for transporting said objects, along the bottom of said hopper and towards said orifice, to said object moving means, said positive conveying means and said hopper bottom being elongated in a direction transverse to the surface to said carrier means.

2. Apparatus of claim 1 wherein said means for moving said objects contacts said objects and urges them towards said receptacle portions of said carier means.

3. Apparatus of claim 1 including drive means for continuously moving said surface.

4. Apparatus of claim 3 wherein said surface moves along a predetermined path.

5. Apparatus of claim 4 wherein said path is arcuate where said surface contacts said objects.

6. Apparatus of claim 4 wherein said surface is provided by a roller and said object transporting means includes a rotatable auger at the bottom of said hopper.

7. Apparatus of claim 6 wherein said spaced array is defined by a plurality of parallel carrier means.

8. Apparatus of claim 7 wherein said spaced array is on the curved surface of a rotatable cylinder and said rotatable auger is generally radially disposed with respect to said cylinder.

9. Apparatus of claim 8 wherein axes of rotation of said roller and said cylinder are parallel.

10. Apparatus for loading individual objects such as pharmaceutical tablets, pharmaceutical capsules or hard candies, into carriers on a curved surface of a rotating cylindrical feed drum, comprising:
(a) a hopper for housing a bulk supply of said objects and including a discharge opening at the hopper bottom;
(b) the cylindrical feed drum rotating to move the curved surface and the object carriers past the discharge opening of the hopper, a portion of said hopper substantially conforming to the shape of said drum, with the object carriers being arranged around the feed drum circumference;
(c) at least one roller, rotating about an axis generally parallel with the axis of rotation of the cylindrical feed drum at a lower portion of the discharge opening, between the bottom of hopper and the cylindrical feed drum, for contacting objects within the hopper close to the discharge opening and urging the contacted objects through the discharge opening and into the object carriers of the feed drum as they pass the hopper discharge opening;
(d) separator guides within the hopper for separating the objects within the hopper into object groups substantially aligned with respective object carriers passing the hopper discharge orifice;
(e) at least one auger rotating about an axis generally radially disposed with respect to the axis of said roller, at the hopper bottom, for transporting objects of at least one of said object groups within a lower portion of said hopper towards said roller for urging thereby through the discharge opening and in the object carriers of the feed drum as they pass the discharge opening, the bottom of said hopper being elongated in a direction transverse to the surface of said drum.

11. A method for loading individual objects into moving carrier means, said carrier means including receptacles for receiving individual objects, comprising the steps of:
(a) placing said objects in a hopper to define a bulk supply of said objects;
(b) moving said carrier means past a hopper discharge orifice located proximate the hopper bottom with said receptacles communicating with the hopper interior via said orifice, with a portion of said hopper substantially conforming to the shape of said carrier means;
(c) applying a first force, to objects which are proximate said orifice via first force application means operatively associated with said hopper and disassociated from said carrier means, in a direction generally towards said receptacles, to urge said objects through said orifice from said hopper towards said receptacles;
(d) applying a second force to objects at the bottom of said hopper via second force application means operatively associated with said hopper and disassociated with said carrier means, said second force application means and said bottom of said hopper being elongated in a direction transverse to the surface of said carrier means in a direction along the bottom of said hopper towards said orifice, to forcibly move objects along the hopper bottom towards said orifice to a position at which said first force application means operates to urge said objects through said orifice towards said receptacles.

12. The method of claim 11 wherein said carrier means move past said orifice continuously.

13. The method of claim 12 wherein said first force is applied by contacting said objects with a moving surface intermediate said orifice and said receptacles, having at least a portion of said surface moving from said orifice towards said receptacles.

14. The method of claim 13 further comprising applying said first force to said objects with a first surface moving towards said receptacles.

15. The method of claim 14 further comprising applying said second force to said objects with a second surface moving in a direction different from said first rotating surface.

16. The method of claim 15 wherein said steps of applying first and second forces to said objects are performed by serially contacting said objects with discrete moving surfaces.

17. The method of claim 16 wherein said moving surfaces are rotating surfaces.

18. The method of claim 17 wherein said rotating surfaces rotate about transverse axes.

19. The method of claim 14 wherein said carrier means move in a circular path and said first surface moves, at a position of closest proximity between said first surface and said carrier means, in a direction different from direction of movement of said carrier means past said orifice.

20. Apparatus for loading individual solid objects into a moving array, comprising:
(a) A hopper for housing a bulk supply of said objects and including a discharge orifice;
(b) conveyor means, defining said array for receiving and transporting said objects, communicating with said hopper via said orifice upon movement thereof past said orifice with receptacle portions thereof facing said orifice, with a portion of said hopper substantially conforming to the shape of said conveyor means;
(c) means operatively associated with said hopper for moving said objects from said hopper to said receptacle portions of said carriers means via said orifice;
(d) means for transporting said objects along the bottom of said hopper to said object moving means, said bottom of said hopper being elongated in a direction transverse to the surface of said means for transporting said objects.

21. Apparatus of claim 20 further comprising biasing means for pressing said objects into said conveyor means after movement of said objects to said conveyor means from said hopper by said moving means.

* * * * *